: US 8,429,183 B2
(45) Date of Patent: *Apr. 23, 2013

(54) SUPPORT FOR INTERNATIONAL SEARCH TERMS

(75) Inventor: James D. Bennett, Hroznetin (CZ)

(73) Assignee: Enpulz, L.L.C., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/459,736

(22) Filed: Apr. 30, 2012

(65) Prior Publication Data

US 2012/0221541 A1 Aug. 30, 2012

Related U.S. Application Data

(63) Continuation of application No. 12/437,600, filed on May 8, 2009, now Pat. No. 8,171, 041.

(60) Provisional application No. 61/053,298, filed on May 15, 2008.

(51) Int. Cl.
 *G06F 17/30* (2006.01)
(52) U.S. Cl.
 USPC .......................................... 707/760
(58) Field of Classification Search .......... 707/602, 707/756, 760, E17.073
 See application file for complete search history.

(56) References Cited

U.S. PATENT DOCUMENTS

2002/0099533 A1* 7/2002 Jaqua ................................ 704/1
2006/0253462 A1* 11/2006 Gras .............................. 707/10

* cited by examiner

*Primary Examiner* — Thu-Nguyet Le
(74) *Attorney, Agent, or Firm* — Garlick & Markison; Bruce E. Garlick

(57) ABSTRACT

A search engine server supports delivery of search results using an international search string option by identifying websites that provide support in English as well as the language of the international search string. The international search string is a search string in any of the languages that are listed/supported by the search engine server. The search engine server delivers web links of websites that provide support in both English as well the language of the international search string by identifying conjugate English terms, strings or phrases for the international search string, that provide exact or approximate equivalent meaning for searching. In addition, the search engine server also provides web links of websites that provide international language support by utilizing a thesaurus in English that provides synonyms for the conjugate English terms. The search engine server also translates websites where there is no support in the language of the search string.

20 Claims, 8 Drawing Sheets

Search Engine's Web Page (www.Search_Engine.com) 321

Enter Search String: 323 [Gypsum 325] [Search] 339
327
● Enable International Terms Support ○ Enable Thesaurus ○ Enable Translation
329  333  335

Search Results Using International Terms Support: 341

1. www.plasterwood.com 351
2. American Drywall 352
3. Drywall How To Manual 353
4. Drywall-Plaster 354

[Prev] 385  [Next] 389

Note: Enabling "International Terms Support" allows you to search using words of your own language, and the search engine provides websites with international support. 393

Client's Browser 395

FIG. 3

Search Engine's Web Page (www.Search_Engine.com) 421

Enter Search String: 423 | Gypsum 425 | 427    [Search] 439

◯ Enable International Terms Support  ⦿ Enable Thesaurus  ◯ Enable Translation
429                                    433                 435

Search Results Using Thesaurus: 441

1. www.gypsum.com 451
2. British Gypsum 452
3. Gypsum (Hydrated Calcium Sulfate) 453
4. Drywall-Plaster 454

[Prev] 485    [Next] 489

Note: Enabling "Thesaurus" allows you to search using words of your own language, and the search engine provides websites with international support based upon equivalent words in English. 493

Client's Browser 495

FIG. 4

Search Engine's Web Page (www.Search_Engine.com) 521

Enter Search String: 523 [Gypsum 525] 527 (Search) 539

◉ Enable International Terms Support 529   ○ Enable Thesaurus 533   ◉ Enable Translation 535

Translated Search Results: 541

1. www.gypsum.com 551
2. British Gypsum 552
3. Gypsum (Hydrated Calcium Sulfate) 553
4. Drywall-Plaster 554

(Prev) 585   (Next) 589

Note: Enabling "Translation" allows you to search using words of your own language, and the search engine provides websites with text translated to your own language. 593

Client's Browser 595

FIG. 5

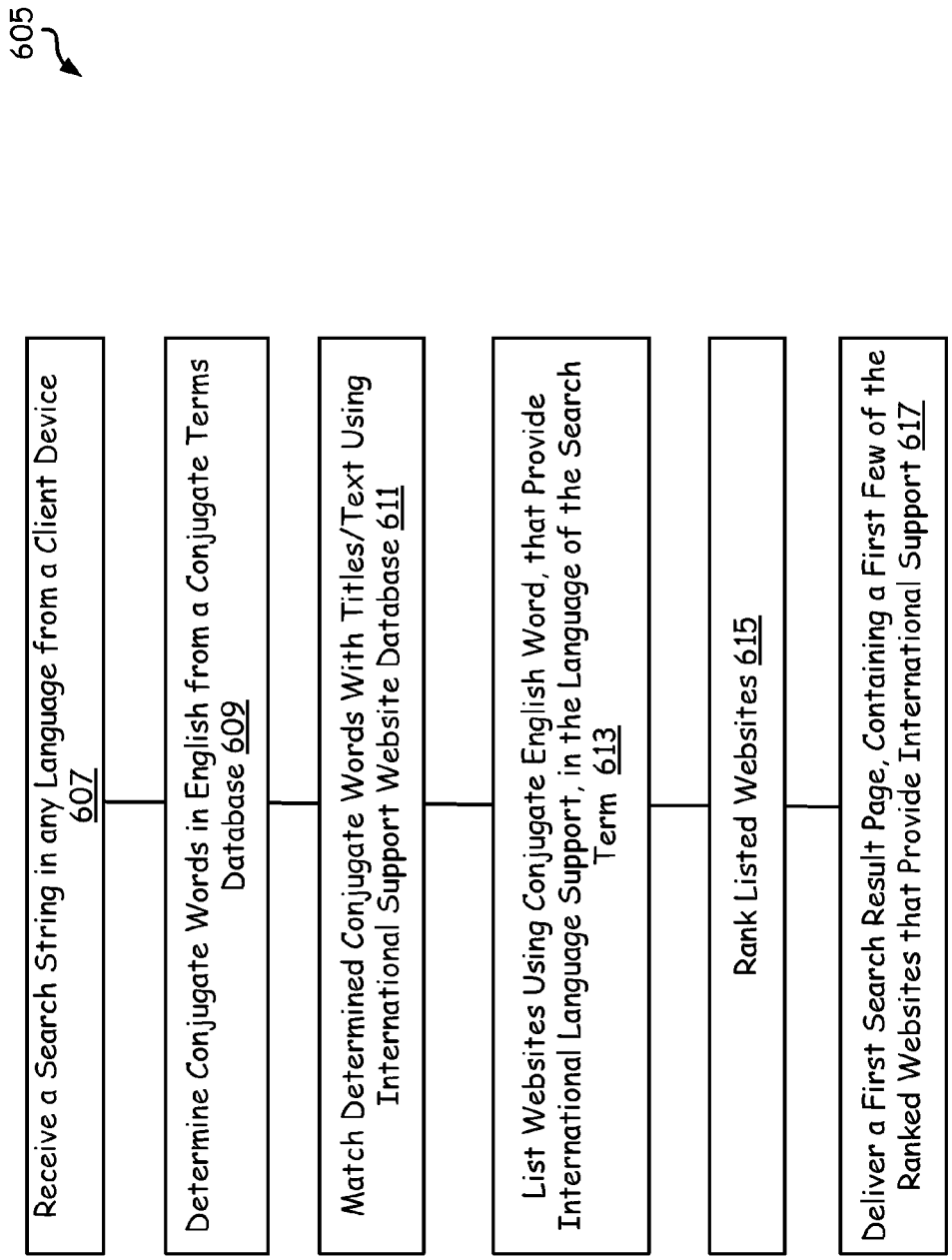

SUPPORT FOR INTERNATIONAL SEARCH TERMS

CROSS REFERENCES TO RELATED APPLICATIONS

The present U.S. Utility patent application claims priority pursuant to 35 U.S.C. §120, as a continuation, to the following U.S. Utility Patent Application which is incorporated herein by reference in its entirety and made part of the present U.S. Utility Patent Application for all purposes:

1. U.S. Utility application Ser. No. 12/437,600, entitled "Support for International Search Terms," filed May 8, 2009, to be issued as U.S. Pat. No. 8,171,041 on May 1, 2012, which claims priority pursuant to 35 U.S.C. §119(e) to U.S. Provisional Application Ser. No. 61/053,298, filed May 15, 2008, entitled "Support for International Search Terms," and having a common title with the present application, both of which are incorporated herein by reference in their entirety for all purposes.

BACKGROUND

1. Technical Field

The present invention relates generally to Internet infrastructures; and, more particularly, to search engines.

2. Related Art

Search engines provide an efficient way to find web sites that provide information about business, commercial, scientific, and other professional and home needs, of which a user does not have any prior information. Search engines allow the user to do shopping via the Internet when the available shopping web sites in a given location are not known beforehand. Search engines also allow the user to download useful files from web sites for games, home needs, professional needs, etc.

When the user is in a foreign land or environment and is searching for some information, typically the search engines provide links of websites that provide information in the local language(s). For example, if the user were in Germany and were to conduct a search using English terms, the search engines typically deliver links of web sites that provide information in German language. The user may not be able to read and interpret the information provided in these web pages for shopping or other professional purposes, due to language barriers.

Some search engines provide translations of web pages, but these translations are not exact and do not provide the same or clear information that was provided in the original language. The user cannot search appropriately if there are no search terms available in a local language in a new city. For example, the user may be in a foreign country and searching for panels for installation on the outside of house (that is, installation on exterior walls or covering for exterior paneling). For a non-English speaker, the entire searching process becomes difficult in such circumstances. Therefore, a need exists to allow for effective searching by a user in an area where searching in the local language is difficult.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 3 is an exemplary schematic block diagram illustrating a snap shot of a search result page containing web links of websites that provide international language support when an international terms support button is enabled;

FIG. 4 is an exemplary schematic block diagram illustrating a snap shot of a search result page containing web links of websites that provide international language support when a thesaurus button is enabled;

FIG. 5 is an exemplary schematic block diagram illustrating a snap shot of a search result page containing web links of websites that provide international language support when a translation button is enabled;

FIG. 6 is a flow diagram illustrating the functionality of the search engine server of FIG. 1 when an international terms support button/option is enabled;

DETAILED DESCRIPTION OF THE DRAWINGS

Figure 1:
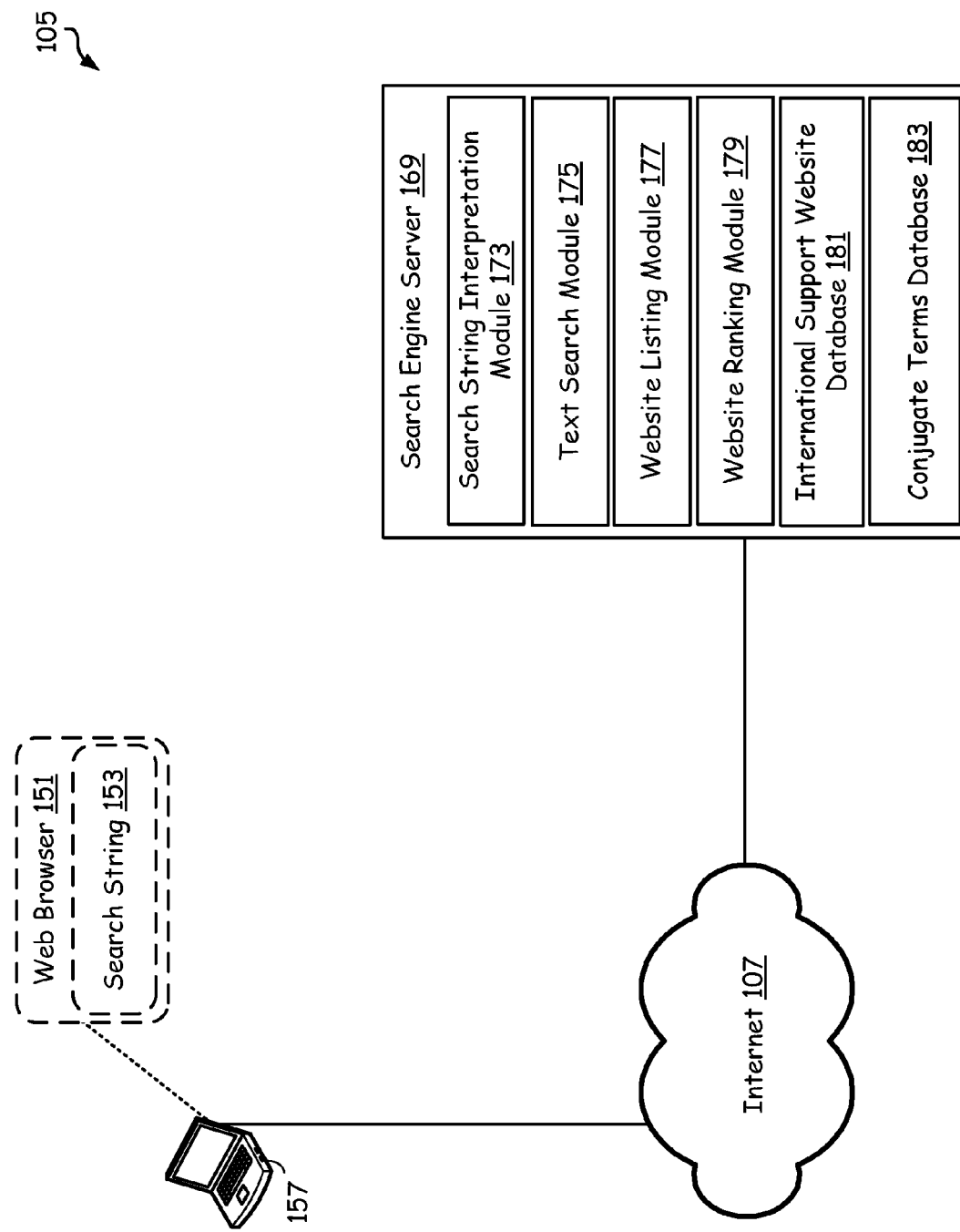
FIG. 1 is a schematic block diagram illustrating an Internet infrastructure containing a client device and a web-browser-accessible search engine server, wherein the search engine server provides support for international search strings.

FIG. 1 is a schematic block diagram illustrating an Internet infrastructure 105 containing a client device 157 and a web-browser-accessible search engine server 169, wherein the search engine server 169 provides support for international search strings 153 over the Internet 107 or a comparable wireless, wire line, and/or other network. Specifically, the search engine server 169 receives an international search string 153 (which might be in one of many international languages known or listed by the search engine server 169) and determines conjugate terms for the international search string 153 in English or some default language, and then searches for websites that provide international language support in both English as well as in language of the international search string. The server 169 ranks the websites based upon the extent of match and popularity (or some other sort factor) and then delivers search result pages containing links of ranked web pages to a user. In another embodiment, the search engine server 169 not only retrieves conjugate terms in English, but also searches for synonyms in English by using a thesaurus and searches for web sites that provide international language support based upon a plurality of synonyms. The server 169 then ranks search result web pages and delivers search result pages containing links of ranked web pages. In addition, the search engine server 169 also provides translation services where web sites having international language support do not provide support in the language used by the international search string 153.

The search engine server 169 implements the above-mentioned functionality by providing access to a search page in a web browser 151 of the client device 157 that contains buttons (or other kinds of selection tools) such as 'enable international terms support', 'enable thesaurus' and 'enable translation'. These selections allow the user the ability to choose actions to be taken by the search engine server 169 in conjunction with the provision of an international search string 153.

Enabling 'enable international terms support' button allows the search engine server 169 to determine the language of the international search string 153 by searching in a database that contains a plurality of international terms or strings and the associated conjugate English terms and interpret the meaning of the international search string 153 in English. Once the English equivalent (that is, conjugate English terms) of the international search string 153 is determined, the search engine server 169 utilizes this English equivalent to match with that of titles of web sites that provide support in both English and the language of the international search string 153 (or, in certain circumstances, in the language of the international search string 153 alone). These web sites that provide international language support in various languages may be compartmentalized and categorized on a language-by-language basis or on a language table/database and stored in another database or an augmented database for access of language support information.

Similarly, enabling 'enable thesaurus' button allows the search engine server 169 to determine the language of the international search string 153, derive conjugate English terms from the database and then identify synonyms for these conjugate English terms and search on the basis of conjugate English terms as well as a plurality of possible synonyms. The search engine server 169 utilizes conjugate English (or one or more other language) terms and the plurality of synonyms (if available) to match the search string with that of titles, identifiers, text, or other meta data of web sites that provide support in both English and the language of the international search string 153 (or, in the language of the international search string 153 alone).

In addition, translations may also be provided by enabling or selecting an 'enable translation' button. In this case, the search engine server 169 follows the above-mentioned steps of identifying conjugate English terms and searches for web sites in both a database containing international language support in the language of the international search string 153 and in general databases containing English language support alone and provides translations wherever necessary.

The search engine server 169 contains a plurality of modules to perform the above-mentioned tasks of determining conjugate English terms and generating synonyms that assist in searching for web pages that provide international language support. These modules include a search string interpretation module 173, a text search module 175, a website listing module 177, a website ranking module 179, an international support website database 181, and a conjugate terms database 183. The modules may be implemented in software, hardware, or a combination of software and hardware.

The search string interpretation module 173 receives the international search string 153 and determines its language by performing language analysis and/or looking into the conjugate terms database 183 for correlations, and then the system retrieves conjugate English terms from the same database. In one embodiment, the conjugate terms database 183 contains strings and terms from various languages listed by the search engine server 169 in one column along with their languages in another column and a plurality of corresponding conjugate English terms in a series of columns. The conjugate English terms are retrieved only if the 'enable international terms support' button is enabled in the web browser 151 (or page displayed thereby), otherwise the same international search terms are used to conduct searching in a normal search mode. Once conjugate English terms are retrieved (which may contain one exact translation English term or may contain a string that provides an exact translation or may also contain a plurality of English terms that provide approximate translations), they are provided as inputs to the text search module 175 to further the searching process.

An 'enable thesaurus' button may be individually enabled within the web browser 151 or may be enabled along with the 'enable international terms support' button or other buttons. If the 'enable thesaurus' button is individually enabled, then the synonyms are searched for in the language of the international search string. Alternatively, if the 'enable thesaurus' button is enabled along with the 'enable international terms support' button, then the process of retrieving conjugate English terms (mentioned in the above paragraphs) is accompanied by retrieving synonyms for the conjugate English terms from a thesaurus database (not shown in this illustration, refer to database 231 of FIG. 2). This process of determining synonyms broadens the scope of search since exact translations in English may not be available for the international search string 153. Once conjugate English terms and their synonyms are retrieved, they are provided as inputs to the text search module 175 to further the searching process.

The text search module 175 utilizes the conjugate English terms (along with their synonyms, if the 'enable thesaurus' button is enabled), to match with the titles (or other information) of web sites that provide international language support in the language of the international search string 153. Web sites that provide international language support in various search engine server listed languages are stored along with the support languages in the international support website database 181.

Then, a website listing module 177 lists the web sites that provide support in both English and the language of the international search string 153 that are retrieved from an international support website database 181. A website ranking module 179 ranks these websites on the basis of extent of match or popularity or some other indicia. Then, the search engine server 169 delivers a first search result page containing a first few (e.g., 5, 10, 15, 20, 50, 100, 200, or more etc.) of the ranked websites to the web browser 151.

As an example, if a person was in Germany and was trying to conduct a search using English terms, what typically would be returned to the user are German language pages and search results. Even though translations may be available, they are not exact. In other words, the user cannot search effectively in Germany if he/she does not use search strings entered in the local language. Similarly, if the user were German and then attempts to search in an English speaking country, then the user would encounter a similar problem. The search engine server 169, in these cases, allows the user to search using international search strings 153 (that is using words in their own languages) by enabling 'enable international terms support' and/or 'enable thesaurus' buttons, and provides web sites that either provide English language support or both English language support and support in the language of the international search string.

For an example of typical situations encountered by users, consider a non-English speaking user wanting to search for drywall (gypsum, plaster, plasterboard, and dry lining systems). In other words, the user is searching for panels that may be used inside of a structure for wall covering or paneling. For the non-English speaker, it is very hard to find search results in a country that speaks primarily English, and the problem is the same for an English speaker in a country that is not predominantly communicating in English. Therefore, the non-English user may search in his/her native language by using the international search term 153 as 'gypsum.'

What results from such searches is typically not useful for the non-English speaker. The system herein provides the non-English speaker with tools such as 'enable international terms support' and/or 'enable thesaurus' and/or 'enable translation' to assist in these situations. The search engine server 169, upon receiving the international search string 153 'gypsum', determines that the conjugate English terms are, for example, plaster, plasterboard, and dry lining systems. Then, the search engine utilizes these words to perform searches and delivers search results accordingly.

Figure 2:
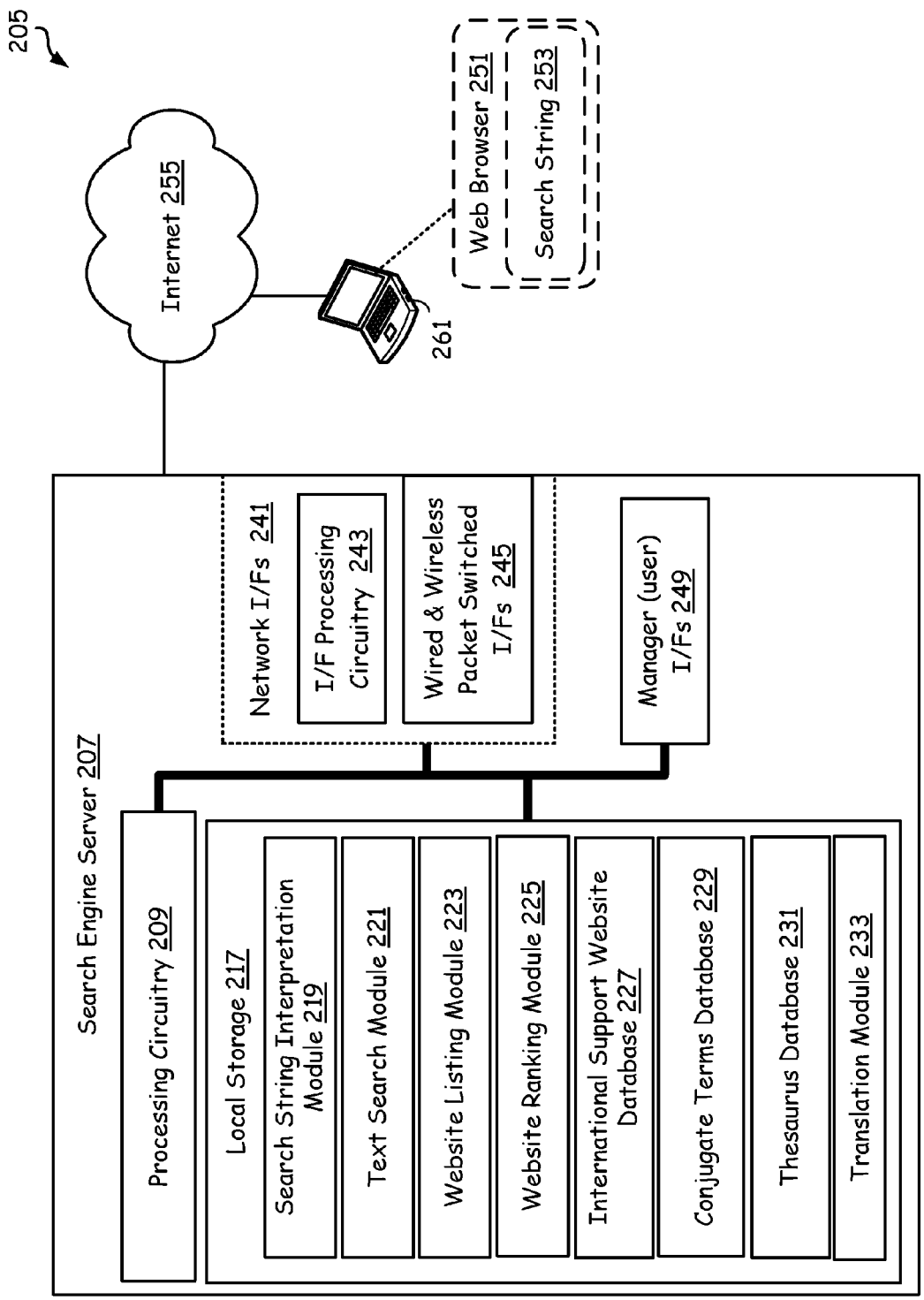
FIG. 2 is a schematic block diagram illustrating various components of the search engine server constructed in accordance with the embodiment of FIG. 1.

FIG. 2 is a schematic block diagram 205 illustrating components of a search engine server 207 (similar to server 169 of FIG. 1) constructed in accordance with the embodiment of FIG. 1. The search engine server 207 may, in part or full, be incorporated into any computing device that is capable of serving as an Internet-based server. The search engine server 207 generally includes processing circuitry (or Central Processing Unit "CPU") 209, local storage/memory 217, manager/user interfaces 249, and network interfaces 241. These components are communicatively coupled to one another via one or more of a system bus, dedicated communication pathways, or other direct or indirect communication pathways. The processing circuitry 209 may be, in various embodiments, a microprocessor, a central processing unit, a digital signal processor, a state machine, a graphics processing unit, an application specific integrated circuit, a field programming gate array, combinations of the forgoing, multi-core systems, or other processing circuitry.

Local storage/memory 217 may be any type of random access memory, read-only memory, flash memory, non-volatile memory, a disk drive, an optical drive, combinations of the foregoing, or another type of memory that is operable to store computer instructions and/or data. The local storage/memory 217 stores computer instructions/data for embodying a search string interpretation module 219, a text search module 221, a website listing module 223, a website ranking module 225, an international support website database 227, a conjugate terms database 229, a thesaurus database 231, and a translation module 233 that facilitate a search using international search strings 253 in accordance with the teachings herein. These elements may be embodied (in this and other embodiments) in software, specific hardware, firmware, general-purpose hardware running certain operations, combinations of the foregoing, or other constructs that perform the specified functions.

Network interfaces 241 contain wired, optical, and/or wireless packet switched or other interfaces 245 and may also contain built-in or an independent interface processing circuitry or CPU 243. The network interfaces 241 allow the search engine server 207 to communicate with client devices such as 261 and to deliver search result pages to web browsers 251. The manager interfaces 249 may include a display and keypad interfaces. These manager interfaces 249 allow a user or an IT expert at the search engine server 207 to control various aspects of the server and surrounding hardware/software. The client device 261 is illustrated as being communicatively coupled to the search engine server 207 via the Internet 255.

The search string interpretation module 219 interprets international search string 253 by looking into the conjugate terms database 229 and retrieving conjugate English (or other base language) terms from the same database. The conjugate terms database 229 contains a plurality of strings and terms from various languages listed by the search engine server 207 and plurality of corresponding conjugate English terms in a series of columns or another construct. These conjugate English terms may simply be equivalent of the international search strings that provide exactly or roughly the same meaning. In certain situations, the international search string 253 provided via a web browser 251 or some other source may contain a string or phrase to approximately provide equivalent meaning. The search string interpretation module 219 retrieves conjugate English terms only if the 'enable international terms support' button is enabled by user. And, the web browser 251 and the international search string 253 reside or are provided by the client device 261 illustrated in FIG. 2, as connected to the circuitry 207 via the Internet 255 or a similar network.

The text search module 221 utilizes the conjugate English terms (along with their synonyms, if 'enable thesaurus' button is enabled) as input, and uses them to match with the titles or other text of web sites that provide international language support in the language of the international search string 253. These web sites that provide international language support in various search engine server listed languages are stored along with the support languages in the international support website database 227.

The website listing module 223 lists the web sites that provide support in both English and the language of the international search string 253 that are retrieved from the international support website database 277. The website ranking module 225 ranks these websites on the basis of extent of match and/or popularity (or some other criteria). Then, the search engine server 207 delivers a first search result page containing first few of the ranked websites to the web browser 251. The translation module 233 provides translation in to the language of the international search string 253 if 'enable translation' button is enabled. More search results are provided if the user elects to crawl through other pages of search results, usually by using back and forward or next and prey arrows as interface control.

In other embodiments, the search engine server 207 of FIG. 2 may include fewer or more components than are illustrated as well as lesser or further functionality. In other words, the illustrated search engine server is meant to merely offer one example of possible functionality and construction in accordance with the present invention, and hardware may be partitioned and combined in different ways that that shown specifically in FIG. 2. Further, additional functionality or hardware may be added without departing from the scope of the present invention.

FIG. 3 is an exemplary schematic block diagram illustrating a snap shot of a search result page 305 containing web links of websites that provide international language support, provided when the international terms support button is enabled. Specifically, the exemplary snap shot illustrated in FIG. 3 shows a search result page 305 delivered to web browser 395 of a client device, containing web links of web sites that provide support in English as well as the language of the international search string (in this case 'Gypsum') 325. The search result page 305 delivered may contain a page title such as 'Search Engine's Web Page (www.Search_Engine.com)' 321. A text such as 'Enter Search String:' 323 and text box 327 are provided to facilitate a user's further searching. An additional search result window containing a title such as 'Search Results Using International Terms Support' 341 displays search results. The search result page 305 also contains the 'prey' 385 and 'next' 389 buttons to access prior displayed search result pages and the subsequent search result pages, respectively. A helpful note such as "Note: Enabling "International Terms Support" allows you to search using words of your own language, and the search engine provides websites with international support" 393 may also be provided.

The search result page 305 also illustrates 'Enable International Terms Support' 329, 'Enable Thesaurus' 333, and 'Enable Translation' 335 buttons/selections. These buttons/selections provide various user options to search using conjugate English terms, synonyms, and translations as taught herein. In this exemplary snap shot, the search result page 305 shows results for the international search string 'Gypsum' 325 based upon conjugate English term 'Drywall'. The search results illustrated 351, 352, 353, and 354 show the results based upon enabling 'Enable International Terms Support' 329 button and based upon the commonly used English conjugate term 'Drywall'. FIG. 3 also illustrates a search button 339 that allows the user of the web browser to commence a search as configured per the interface of FIG. 3.

FIG. 4 is an exemplary schematic block diagram illustrating a snap shot of a search result page 405 containing web links of websites that provide international language support and that are provided when the thesaurus button is enabled. Specifically, the exemplary snap shot illustrated in FIG. 4 shows a search result page 405 delivered to web browser 495 of a client device, containing web links of web sites that provide support in English as well as the language of the international search string (in this case 'Gypsum') 425, based upon enabling of the 'Enable Thesaurus' 433 button.

The search result page 405 that is delivered may contain a page title such as 'Search Engine's Web Page (www.Search_Engine.com)' 421. A text such as 'Enter Search String:' 423 and text box 427 are provided to facilitate user's further search. An additional search results window containing a title such as 'Search Results Using Thesaurus' 441 displays search results. The search result page 405 also contains the 'prey' 485 and 'next' 489 buttons to access prior displayed search result pages and the subsequent search result pages, respectively. A helpful note such as "Note: Enabling "Thesaurus" allows you to search using words of your own language, and the search engine provides websites with international support based upon equivalent words in English" 493 may also be provided.

The search result page 405 also illustrates 'Enable International Terms Support' 429, 'Enable Thesaurus' 433, and 'Enable Translation' 435 buttons/selections and illustrates the 'Enable Thesaurus' button/selection 433 being enabled. In the current exemplary snap shot, the search result page 405 shows results for the international search string 'Gypsum' 425 based upon synonyms (in this case based upon a scientific equivalent word) for the conjugate English term 'Drywall' such as 'hydrated calcium sulfate' and the derived search results. The search results illustrated as results 451, 452, 453, and 454 show the results based upon enabling 'Enable Thesaurus' 433 button and based upon the commonly used synonyms for English conjugate term 'Drywall'. FIG. 4 also shows a search button 439 that allows a user of the browser to begin a search operation as configured by the interface of FIG. 4.

FIG. 5 is an exemplary schematic block diagram illustrating a snap shot of a search result page containing web links of websites that provide international language support, provided when the translation button is enabled. In specific, the exemplary snap shot illustrated in FIG. 5 shows a search result page 505 delivered to web browser 595 of a client device, containing web links of web sites that provide support in English as well as the language of the international search string (in this case 'Gypsum') 525 and provide translations that support in the language of the international search string 525 or in English if not available. The search result page 505 that is delivered may contain a page title such as 'Search Engine's Web Page (www.Search_Engine.com)' 521. A text such as 'Enter Search String:' 523 and text box 527 are provided to facilitate a user's further searching. An additional search result window containing a title such as 'Translated Search Results' 541 displays search results. The search result page 505 also contains the 'prey' 585 and 'next' 589 buttons to access prior displayed search result pages and the subsequent search result pages, respectively. A helpful note such as "Note: Enabling "Translation" allows you to search using words of your own language, and the search engine provides websites with text translated to your own language" 593 may also be provided.

The search result page 505 also illustrates 'Enable International Terms Support' 529, 'Enable Thesaurus' 533 and 'Enable Translation' 535 buttons/selections. These buttons/selections provide user options to search using conjugate English terms, synonyms, and translations as taught herein. In this exemplary snap shot, the search result page 505 shows results for the international search string 'Gypsum' 525 based upon conjugate English term 'Drywall', and provides translations for a few of the web sites where international language support is not available. The search results illustrated as results 551, 552, 553, and 554 show the results based upon enabling 'Enable International Terms Support' 529 button/selection, and based upon the commonly used English conjugate term 'Drywall' and provides translations for a few of the web sites. The search results are obtained by utilizing the search button 539 of FIG. 5 once a search is properly configured per the interface of FIG. 5.

FIG. 6 is a flow diagram illustrating functionality 605 of the search engine server of FIG. 1, when the international terms support button/option is enabled. The functionality begins at a block/step 607, with the search engine server receiving international search string (that is, a search string in one of the languages listed by the search engine server) from the client device. Then, at a next block/step 609, the search engine server determines conjugate words in English from a conjugate terms database. The conjugate words in English may provide exact or approximate equivalent terms or strings to the international search string.

At a next block/step 611, the search engine server matches English conjugate words with titles or other searchable text using international support website database. The websites stored in the international support website database provide international language support in at least English and the language of international search string. At a next block/step 613, the search engine server lists websites that match with the conjugate English terms that provide support at least in English and the language of the international search string.

At a next block/step 615, the search engine server ranks listed websites on the basis of extent of match and/or popularity or some other factors. Then, at a final block/step 617, the search engine server delivers a first search result page containing first few of the ranked websites that provide international language support.

Figure 7:
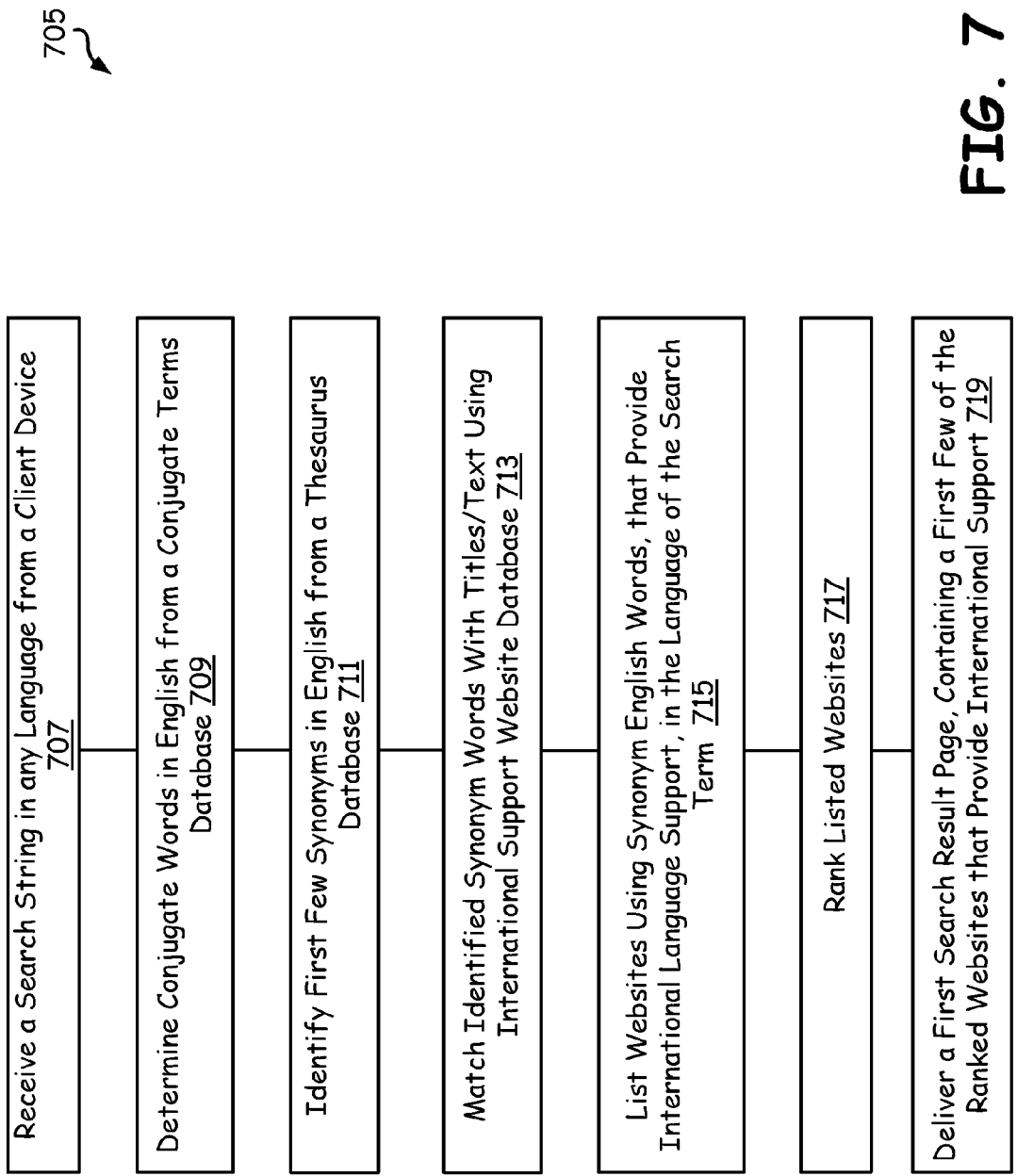
FIG. 7 is a flow diagram illustrating the functionality of the search engine server of FIG. 1 when the thesaurus option is enabled.

FIG. 7 is a flow diagram illustrating functionality 705 of the search engine server of FIG. 1, when the thesaurus button/option is enabled. The functionality begins at a block/step 707, with the search engine server receiving international search string from a client device. Then, at a next block/step 709, the search engine server determines conjugate words in English from a conjugate terms database.

At a next block/step 711, the search engine server identifies synonyms in English from a thesaurus database for the conjugate words in English. At a next block/step 713, the search engine server matches English conjugate words as well as the synonyms in English with titles using international support website database. The international support website database contains web links that provide international language support in at least English (or some base selected main language) and the language of international search string. At a next block/step 715, the search engine server lists websites that match with the conjugate English terms as well as the synonyms in English that provide support at least in English and the language of the international search string.

At a next block/step 717, the search engine server ranks listed websites on the basis of extent of match and/or popularity. Then, at a final block/step 719, the search engine server delivers a first search result page containing first few of the ranked websites that provide international language support.

Figure 8:
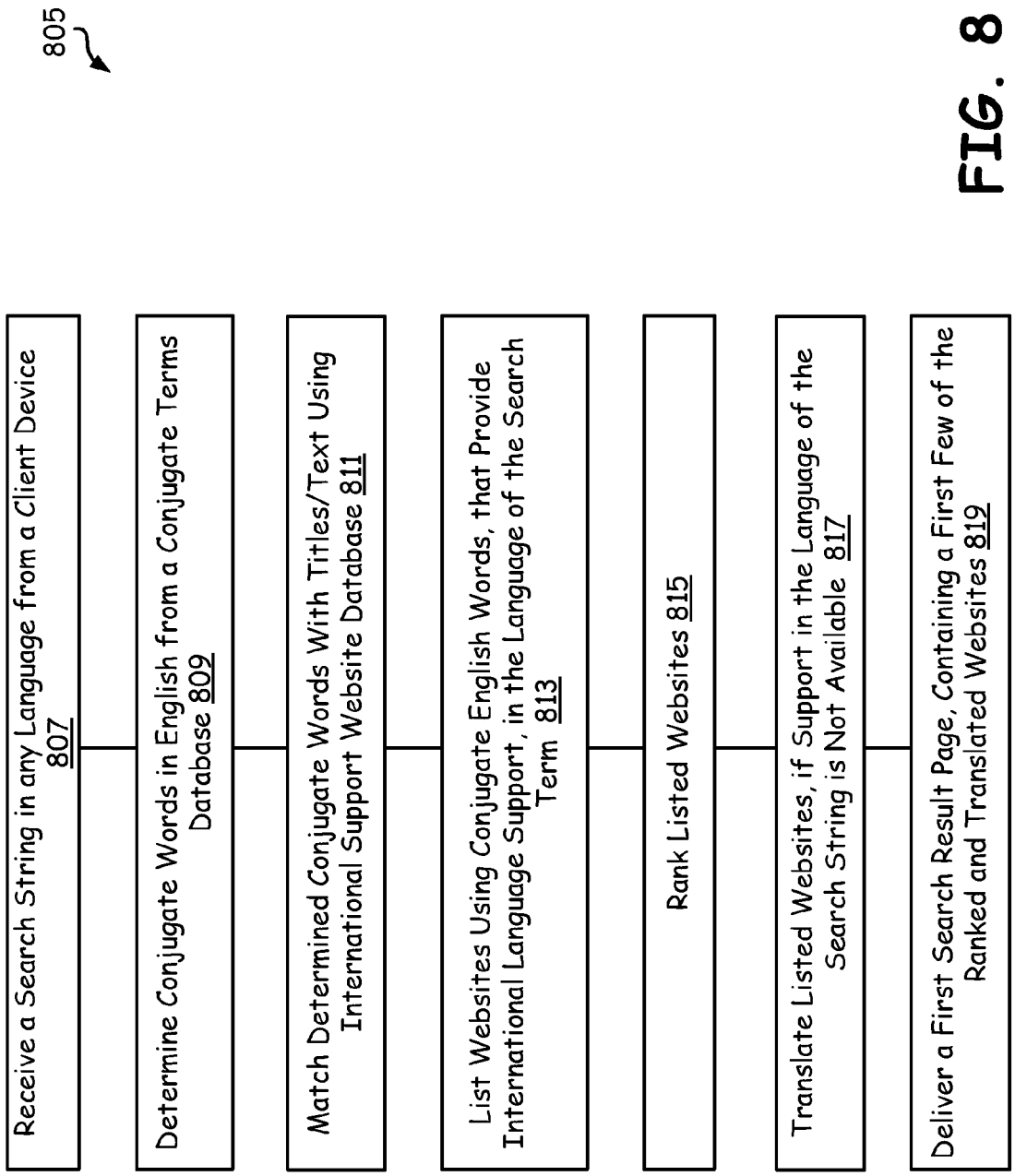
FIG. 8 is a flow diagram illustrating the functionality of the search engine server of FIG. 1 when translation options are enabled.

FIG. 8 is a flow diagram illustrating functionality 805 of the search engine server of FIG. 1, when the translation button/option is enabled. The functionality begins at a block/step 807, with the search engine server receiving international search string from a client device. Then, at a next block/step 809, the search engine server determines one or more conjugate words in English from a conjugate terms database.

At a next block/step 811, the search engine server matches English conjugate words with titles using international support website database. The international support website database contains web links that provide international language support in at least English (or the primary selected language) and the language of international search string. At a next block/step 813, the search engine server lists websites that match with the conjugate English terms that provide support at least in English and the language of the international search string.

At a next block/step 815, the search engine server ranks listed websites on the basis of extent of match and/or popularity. Then, at a block/step 817, the search engine server provides translated websites that are listed, if support in the language of search string is not available. At a final block/step 819, the search engine server delivers a first search result page containing first few of the ranked websites that provide international language support as well as translated websites.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A search engine server comprising:
processing circuitry;
memory coupled to the processing circuitry; and
network circuitry, the processing circuitry, memory, and network circuitry are operable to:
receive an international search string;
determine the language of the international search string via correlation with a conjugate terms database;
retrieve a conjugate target language term from the conjugate terms database;
in response to determining that international terms support is enabled, facilitate searching of websites having international language support using the conjugate target language term;
in response to determining that international terms support is disabled, facilitate searching of websites having international language support using the international search string; and
deliver a search results page via the network circuitry to a web browser associated with a client device, wherein the search results page comprises links of a few search results that link to a few websites.

2. The search engine server of claim 1, wherein the processing circuitry, memory, and network circuitry are further operable to:
use synonyms of the conjugate target language to find the few search results in the search results page, and
translate search results before providing at least some of the search results page content to a user.

3. The search engine server of claim 1, wherein the processing circuitry, memory, and network circuitry are further operable to access an international language support website database comprising lists of websites that provide information in the language of the international search string.

4. The search engine server of claim 1, wherein the target language is English.

5. The search engine server of claim 4, wherein the processing circuitry, memory, and network circuitry are further operable to match the retrieved conjugate English terms to text associated with websites that have international language support.

6. The search engine server of claim 5, wherein the processing circuitry, memory, and network circuitry are further operable to rank the websites that have international language support, based upon the extent of a match between the search string and text associated with the websites.

7. The search engine server of claim 6, wherein the processing circuitry, memory, and network circuitry are further operable to deliver a search results page comprising links of a few of the ranked websites having international language support for graphical display on a display screen associated with a client device.

8. The search engine server of claim 5, wherein the processing circuitry, memory, and network circuitry are further operable to rank the websites having international language support based upon a recorded popularity calculation associated with the search results.

9. The search engine server of claim 8, wherein the processing circuitry, memory, and network circuitry are further operable to deliver a search results page comprising links for the few of the ranked websites having international language support provided in the language used in the international search string.

10. A search engine server comprising:
processing circuitry;
memory coupled to the processing circuitry; and
network circuitry, the processing circuitry, memory, and network circuitry are operable to:
receive an international search string;
determine the language of the international search string via correlation with a conjugate terms database, and retrieve a conjugate English term from a conjugate terms database;
in response to determining that international terms support is enabled, facilitate searching of websites having international language support using the conjugate English term;
in response to determining that international terms support is disabled, facilitate searching of websites having international language support using the international search string; and
deliver a search results page via the network circuitry to a web browser associated with a client device, wherein the search results page comprises links of a few search results that link to a few websites.

11. The search engine server of claim 10, wherein the processing circuitry, memory, and network circuitry are further operable to:
use synonyms of the conjugate target language to find the few search results in the search results page, and
translate search results before providing at least some of the search results page content to a user.

12. The search engine server of claim 10, wherein the processing circuitry, memory, and network circuitry are further operable to interpret the international search string by retrieving synonyms of the conjugate English terms from a thesaurus database.

13. The search engine server of claim 12, wherein the processing circuitry, memory, and network circuitry are further operable to match synonyms of the conjugate English terms to that of text associated with websites having international language support, resulting in a listing of websites that match the retrieved synonyms.

14. The search engine server of claim 13, wherein the processing circuitry, memory, and network circuitry are further operable to rank the listed websites having international language support, wherein ranking is based upon the extent of the match between the conjugate English terms and text associated with the websites.

15. The search engine server of claim 14, wherein the processing circuitry, memory, and network circuitry are further operable to deliver a search results page comprising links of a few of ranked websites having international language support, wherein the ranked websites are provided in a language of the international search string.

16. The search engine server of claim 12, wherein the processing circuitry, memory, and network circuitry are further operable to rank the listed websites having international language support, wherein ranking is based upon a popularity factor of the websites.

17. The search engine server of claim 16, wherein the processing circuitry, memory, and network circuitry are further operable to:
deliver a search results page comprising links of a few of the ranked websites having international language support; and
perform language translation on content provided with the few of the ranked websites.

18. A method of operating a search engine server comprising:
receiving an international search string from a web browser via a network interface;

determining a supported language of the international search string via correlation with a conjugate terms database determining conjugate English terms for the international search string using a conjugate terms database;

identifying synonyms for the conjugate English terms using a thesaurus database;

in response to determining that international terms support is enabled, selecting websites by matching the conjugate English terms and synonyms with text associated with the websites;

in response to determining that international terms support is disabled, selecting websites by matching the international search string with text associated with the websites;

ranking selected websites based upon extent of match and site popularity to create ranked websites; and delivering a search results page containing links of few of the ranked websites to the network browser via the network interface.

19. The method of claim 18, further comprising supporting website language translation services for web content that is not supported in the language of the international search string.

20. The method of claim 18, further comprising:

selecting websites that provide support in the language used to provide the search string; and selecting the websites from an international language support website database.

* * * * *

UNITED STATES PATENT AND TRADEMARK OFFICE
CERTIFICATE OF CORRECTION

| | | |
|---|---|---|
| PATENT NO. | : 8,429,183 B2 | |
| APPLICATION NO. | : 13/459736 | |
| DATED | : April 23, 2013 | |
| INVENTOR(S) | : James D. Bennett | |

It is certified that error appears in the above-identified patent and that said Letters Patent is hereby corrected as shown below:

In the Claims

Col. 13, lines 2-3, in claim 18: after "terms database" insert --;--

Signed and Sealed this
Eleventh Day of February, 2014

Michelle K. Lee
*Deputy Director of the United States Patent and Trademark Office*